United States Patent
Weber

[15] 3,704,533
[45] Dec. 5, 1972

[54] TACHISTOSCOPE

[72] Inventor: Raymond B. Weber, Oconomowoc, Wis.

[73] Assignee: Milprint, Inc., Milwaukee, Wis.

[22] Filed: June 24, 1970

[21] Appl. No.: 49,373

[52] U.S. Cl. ........................... 35/35 B, 206/45.31
[51] Int. Cl. ............................................. G09b 17/04
[58] Field of Search ............... 35/35 B, 35 J, 31 G

[56] References Cited

UNITED STATES PATENTS

| | | | |
|---|---|---|---|
| 2,723,466 | 11/1955 | Ott | 35/35 B |
| 3,411,223 | 11/1968 | Vinci | 35/35 B |
| 2,724,911 | 11/1955 | Schuman | 35/35 B |
| 2,647,329 | 8/1953 | Block et al. | 35/35 B |
| 705,579 | 7/1902 | Gibson | 35/31 G |
| 2,840,925 | 7/1958 | Dunson | 35/35 B |

*Primary Examiner*—Wm. H. Grieb
*Attorney*—Donald G. Casser and Allan W. Leiser

[57] ABSTRACT

A tachistoscope formed of a paperboard blank folded into a sleeve and a shutter which slides freely within the sleeve. A viewing window in the front wall of the sleeve is aligned with an index window in the back wall, and an index card containing printed matter is retained against the back wall of the sleeve over the index window. The shutter is dropped through the sleeve and an opening in the shutter momentarily passes between the windows to allow a person looking through the viewing window a brief glimpse of the printed matter on the index card.

3 Claims, 6 Drawing Figures

INVENTOR
RAYMOND B. WEBER

ATTORNEY

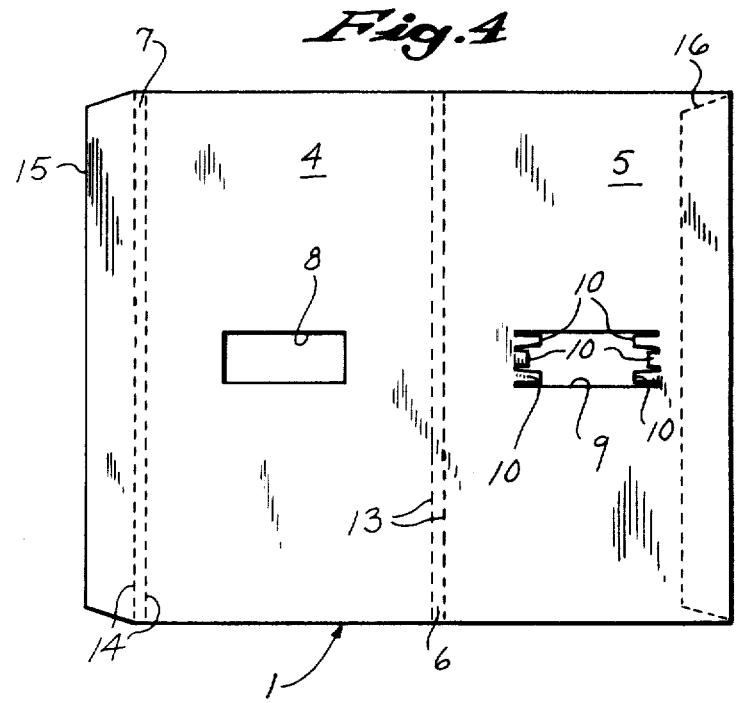
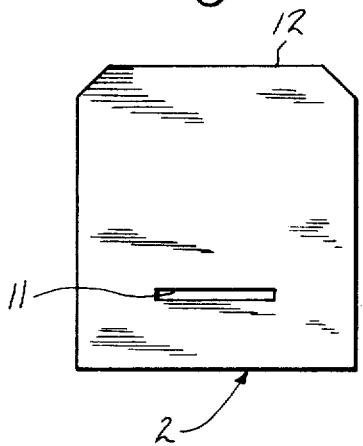
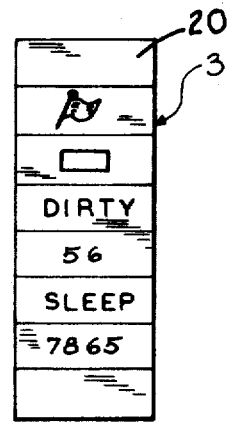

TACHISTOSCOPE

BACKGROUND OF THE INVENTION

1 Field

This invention relates to the field of devices which momentarily show persons printed information to train them to rapidly recognize various symbols, words, indices or the like.

2. Prior Art

There are various types of tachistoscopes, most of which involve the use of electronic timing circuits or complex mechanical apparatus. Electronic tachistoscopes include timers which turn on lights to expose the information for a short time interval in response to the actuation of a switch; the use of electronic timers adds considerably to the cost of the device. Numerous mechanical tachistoscopes have been developed, but like the electronic devices, their complex mechanisms result in a costly item. An inexpensive tachistoscope which avoids the use of electronic circuitry or complex mechanical apparatus was disclosed by D. O. Schuman in his U.S. Pat. No. 2,724,911 which issued Nov. 29, 1955. The Schuman tachistoscope shows a shutter which moves by gravity to momentarily expose an index card mounted on the back of the slide through an opening in the shutter. Although the Schuman device appears to be considerably lower the cost of tachistoscopes, the structure disclosed by Schuman does not lend itself to easy and inexpensive construction and packaging.

SUMMARY OF THE INVENTION

My present invention relates to a tachistoscope having a sleeve formed from a blank which is folded to provide a rectangular front wall containing a viewing window, a rectangular back wall containing an index window, and two side walls which connect the front and back walls; also an index card containing printed information is slidably retained against the back wall over the index window by means of retainer tabs to expose the information thereon to view through the viewing window in the front wall; and a shutter is adapted to slide within the sleeve between a first position in which the shutter blocks the index card from view through the viewing window and a second position in which the index card is blocked from view. The shutter contains an opening oriented to align between the index and viewing windows at a position intermediate the first and second positions, wherein the information on the index card is momentarily exposed to a person looking through the viewing window when the shutter is dropped from its first position.

The index card contains a column of information which can be aligned one at a time immediately behind the index window by sliding the index card between the retainer tabs. When the desired information is aligned, the shutter is inserted into the sleeve between the viewing window and index window. When the shutter is released, it moves downward through the sleeve. The opening in the shutter momentarily passes between the viewing and index windows to provide the subject with a glimpse of the information on the index card. The opening at the bottom of the sleeve rests on a surface, or is blocked by the operator's fingers, and the downward motion of the shutter is stopped at a point where the information remains blocked from view by the upper portion of the shutter.

The time interval in which the information is exposed to the subject can be varied by altering the width of the shutter opening. The shutter is completely removable from the sleeve, and therefore, a plurality of shutters having openings of various widths can be provided and used individually in the sleeve.

It is an object of the invention to provide an inexpensive tachistoscope which can be easily formed from inexpensive materials such as paperboard. The sleeve with retainer tabs is formed from a single paperboard blank which is easily cut, folded and glued. Similarly, the index card can be made from paperboard. The shutter can also be formed from paperboard, however, more consistent operation is obtained by using a heavier material such as plastic. A more specific object is to provide the particular tachistoscope constructions hereinafter specifically claimed.

DESCRIPTION OF THE DRAWINGS

The present invention is described herein with reference to the accompanying drawings which illustrate a presently-preferred embodiment. The drawings are meant to illustrate, not limit, this invention inasmuch as it is anticipated that those skilled in the art will be able to devise changes from the illustrated embodiment that will remain within the true scope of this invention, and it is intended to embrace all such changes within the scope of the claims. In the drawings:

FIG. 4 is a plan view of a sleeve blank used to form part of the tachistoscope;

FIG. 5 is a plan view of the shutter used in the tachistoscope; and

FIG. 6 is a plan view of an index card used with the tachistoscope of this invention.

DESCRIPTION OF THE PREFERRED EMBODIMENT

Figure 1:
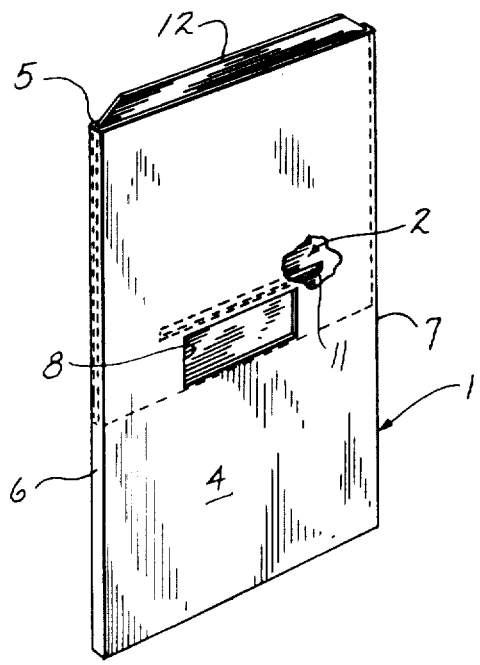
FIG. 1 is a perspective view of the tachistoscope in accordance with this invention with its shutter in the first or upper position.
Figure 2:
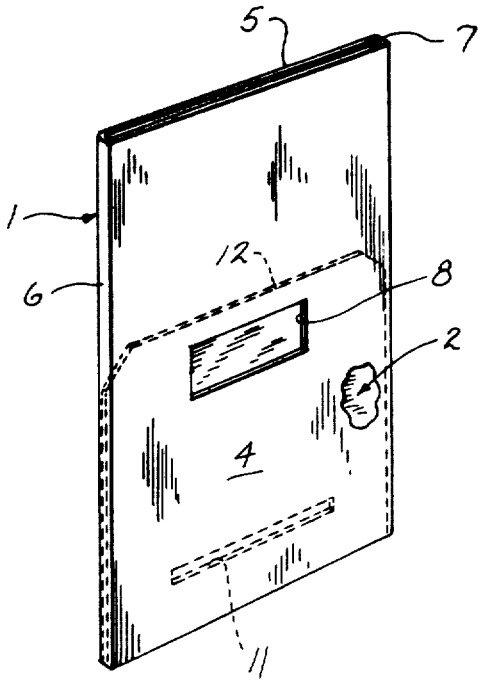
FIG. 2 is a perspective view of the tachistoscope with the shutter in its second or down position.
Figure 3:
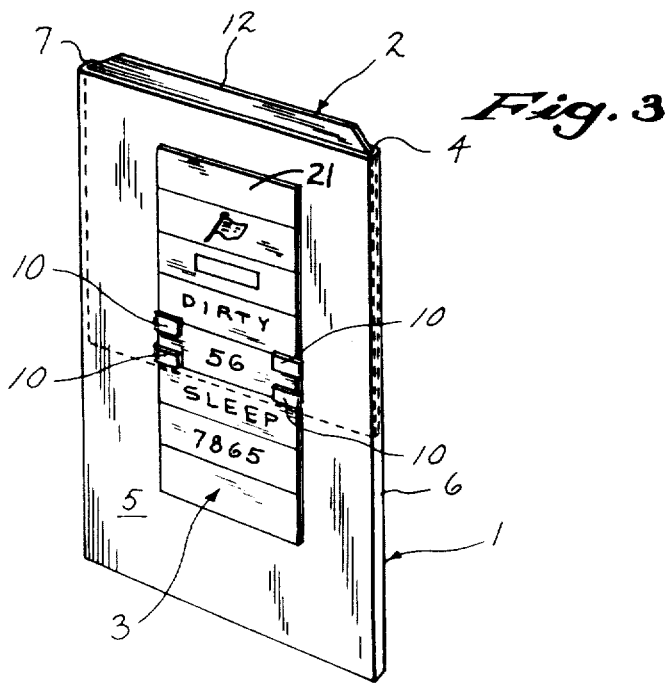
FIG. 3 is a perspective view of the tachistoscope with an index card attached.

Referring to FIGS. 1, 2 and 3, the tachistoscope has three basic components, a sleeve 1, a shutter 2 and an index card 3. The sleeve 1 is made of paperboard folded to provide a hollow interior of rectangular cross-section. The sleeve 1 so formed has a rectangular front wall 4 and a rectangular back wall 5 connected together along two of their opposing edges by the side walls 6 and 7. The side walls 6 and 7 are relatively long and narrow to form a sleeve having front and back walls 4 and 5 parallel to each other and spaced a relatively short distance apart and having open top and bottom ends. A cross-section of the sleeve 1 is, therefore, an elongated rectangle which defines a slot.

The front wall 4 has a rectangular-shaped opening, or viewing window 8, formed through it. A rectangular-shaped index window 9 is formed in the back wall 5. The viewing and index windows 8 and 9 are of approximately the same size and shape, and they are aligned with each other to provide a direct line of sight through the sleeve 1 perpendicular to the plane of the front and back walls 4 and 5. Formed along each of two opposing edges of the index window 9 are retainer tans 10, see FIG. 4. The rectangular-shaped index card 3 is inserted underneath the retainer tabs 10 and retained against the outside surface of the back wall 5 to be held in place directly over the index window 9 as shown in FIG. 3, and printed information contained on the card 3 is visible through the viewing window 8 in the front wall 4.

The shutter 2 is constructed of a relatively dense material such as plastic, and it has a generally rectangular shape. The shutter 2 fits loosely inside the sleeve 1 and slides easily along the length of its interior. A rectangular-shaped opening 11 is formed in the shutter 2.

When operated, the sleeve 1 is oriented in the vertical position as shown in FIG. 1, and the shutter 2 is inserted into the interior of the sleeve 1 through its open top end. The lower portion of the shutter 2 is interposed between the viewing and index windows 8 and 9 to completely block sight of the index card 3 when viewed through the viewing window 8. The shutter 2 is retained by the operator in this first or "up" position by holding the upper edge 12 of the shutter 2. When the operator releases the upper edge 12, the shutter 2 drops downward and the shutter opening 11 momentarily passes between the viewing and index windows 8 and 9 to provide a short glimpse of the information on the index card 3. The downward motion of the shutter 2 terminates as the lower edge of the shutter reaches the bottom of the sleeve 1, and the index card is again blocked from sight by the shutter. The shutter 2, therefore, drops from a first or "up" position in which it blocks sight of the index card, to a second or "down" position in which it again blocks sight of the index card 3 after briefly exposing the card. Movement is caused by gravity, thus eliminating the need for complex mechanical apparatus.

Referring to FIG. 4, the sleeve 1 is formed by cutting and folding a single blank of paperboard. The closely spaced parallel fold lines 13 define the side wall 6 and separate the rectangular back wall portion 5 from the rectangular front wall portion 4. Likewise fold lines 14 define the side wall 7. A foldable glue flap 15 is connected to the side wall 7. The viewing window 8 is cut from the center of the front wall 4, and the index window 9 and retainer tabs 10 are cut from the center of the back wall 5.

The sleeve 1 is formed by making successive right angle bends along the fold lines 13 and 14, and attaching the glue flap 15 to the inner edge of the back wall 5 by any suitable adhesive as indicated in FIG. 4 by the dotted line 16. Thus, the tachistoscope of the present invention can be made inexpensively from paperboard, and can be supplied to a user in the from of either a flat blank or a folded, glued sleeve.

As shown in FIG. 5 the shutter 2 is also made from a blank. The invention contemplates the use of numerous shutters each having openings 11 of different widths. By using various shutters with different sizes of openings, the time interval during which a person sees the index card 3 can be varied by merely substituting shutters 2.

As shown in FIG. 6, the index card 3 is constructed from a rectangular blank which is subdivided into a number of portions. Different information is printed on each portion and is alignable over the index window 9 by sliding the index card 3 between the retaining tabs 10. Consequently, a large number of symbols, words, numerals or the like can be tested without changing index cards. A particularly useful structure for the index card 3 is illustrated in the drawings wherein identical information printed on the front face 20 of the card (FIG. 6) is repeated on its rear face 21 (FIG. 3), the information on the rear face being aligned with that on the front face. This facilitates the use of the present tachistoscope as a teaching device because an instructor or operator is able to position the specific information on the front face of the card that will be exposed through the viewing window 8 while he views the rear face of the index card to select the information. The operator can hold the rear of the tachistoscope towards him as in FIG. 3 and the front of the tachistoscope towards a subject or class as in FIGS. 1 and 2 while he selects the information to be viewed by the class. The instructor can change the data that is being shown to the class without turning the tachistoscope over and without interrupting the visual presentation to the class, which is valuable when a sequence of information is to be displayed.

I claim

1. A tachistoscope comprising, in combination: a hollow sleeve formed from a foldable blank, which blank includes;
   a front wall portion containing a viewing window,
   a back wall portion containing an index window,
   a first side wall portion disposed between said front and back wall portions and being defined by a first pair of parallel fold lines,
   a glue flap, and
   a second side wall being defined by a second pair of parallel fold lines which are parallel to the first pair of fold lines, wherein the viewing window and the index window are positioned in the respective front and back wall portions of the blank such that they are in alignment with one another when the blank is folded to form the sleeve;
   an index card retainable against the back wall to cover the index window and including information which is to be exposed to view through the viewing window; and
   a shutter adapted to slide within the sleeve from a first position in which the shutter blocks the index card from view through the viewing window to a second position in which it also blocks the index card from view, which shutter contains an opening oriented to align between the index and viewing windows at a shutter position intermediate the first and second positions, wherein the shutter is inserted into the sleeve by the user and released to fall from the first to the second position such that a person looking through the viewing window can momentarily see the information contained on the index card when the opening in the shutter passes between the viewing and index windows.

2. The tachistoscope as recited in claim 1, wherein retainer tabs are formed along two opposing edges of said index window, which tabs are adapted to hold the index card against the back wall and allow limited movement of the index card in order to align information contained thereon over the index window.

3. The tachistoscope as recited in claim 1, wherein the index card includes identical information on both its front and rear faces, with the information on its rear face aligned with the information on its front face so that information on the front face selected for exposure through the viewing window will also be visible to an operator viewing the rear face of the index card.

* * * * *